US007071992B2

(12) United States Patent
Chen et al.

(10) Patent No.: US 7,071,992 B2
(45) Date of Patent: Jul. 4, 2006

(54) METHODS AND APPARATUS FOR BRIDGING DIFFERENT VIDEO FORMATS

(75) Inventors: Chang-Lun Chen, Hsin-Chu (TW); Hsiao-Ming Huang, Kao-Hsiung (TW); Meng-Hsiu Wei, Hsin-Chu (TW)

(73) Assignee: Macronix International Co., Ltd., Hsinchu (TW)

( * ) Notice: Subject to any disclaimer, the term of this patent is extended or adjusted under 35 U.S.C. 154(b) by 855 days.

(21) Appl. No.: 10/090,176

(22) Filed: Mar. 4, 2002

(65) Prior Publication Data

US 2003/0164897 A1 Sep. 4, 2003

(51) Int. Cl.
*H04N 7/01* (2006.01)
(52) U.S. Cl. .................................... 348/441; 348/458
(58) Field of Classification Search ............... 348/441, 348/500, 501, 536, 537, 458, 714, 715, 581
See application file for complete search history.

(56) References Cited

U.S. PATENT DOCUMENTS

| 4,532,602 | A | | 7/1985 | DuVall | |
|---|---|---|---|---|---|
| 4,546,349 | A | | 10/1985 | Prohofsky et al. | |
| 4,589,029 | A | | 5/1986 | Torimaru et al. | |
| 4,604,651 | A | | 8/1986 | Frencken et al. | |
| 4,703,353 | A | * | 10/1987 | David | 348/441 |
| 4,746,981 | A | | 5/1988 | Nadan et al. | |
| 4,821,031 | A | | 4/1989 | Roberts | |
| 4,872,054 | A | * | 10/1989 | Gray et al. | 348/441 |
| 4,891,702 | A | | 1/1990 | Nakayama et al. | |
| 4,914,507 | A | | 4/1990 | Smith et al. | |
| 4,952,923 | A | | 8/1990 | Tamura | |
| 5,001,697 | A | | 3/1991 | Torres | |

(Continued)

FOREIGN PATENT DOCUMENTS

EP 0 479 508 A2 4/1992

(Continued)

OTHER PUBLICATIONS

N. Kasai, T. Furuhashi, H. Man, H. Kurihara, N. Kato, and M. Mori, "26.4L: Late-News Paper: Development of 13.3-in. Super TFT-LCD Monitor," SID 96 Digest, pp. 414-417.

*Primary Examiner*—Victor R. Kostak
(74) *Attorney, Agent, or Firm*—Haynes Beffel & Wolfeld; Mark Haynes

(57) ABSTRACT

A video format bridge employs a plurality of techniques to insure that the line buffer does not suffer underflow or overflow conditions, and that the output frame rate matches the input frame rate. The bridge handles the problem of residue lines, addresses fluctuations in the input and output clock rates, and allows adjustment of the ratio of the input and output the number of lines per frame or number of pixels per line so that output device specifications are not exceeded. A single integrated circuit may provided which is adapted to perform a plurality of techniques, and includes resources by which the user is able to enable and disable such techniques as needed for the particular bridging operation being executed. Bridge logic produces an output video stream which has an output frame rate matching the input frame rate, and in which the output frame has at least one of a variable number of pixels per line within an output frame, and/or a variable number of lines per frame among output frames in a set of more than one output frames.

35 Claims, 11 Drawing Sheets

U.S. PATENT DOCUMENTS

| | | |
|---|---|---|
| 5,084,765 A * | 1/1992 | Morita et al. ............ 348/432.1 |
| 5,122,789 A | 6/1992 | Ito |
| 5,138,448 A | 8/1992 | Gillies et al. |
| 5,170,256 A | 12/1992 | Tabata |
| 5,243,433 A | 9/1993 | Hailey |
| 5,253,064 A | 10/1993 | Yamamoto et al. |
| 5,257,103 A | 10/1993 | Vogeley et al. |
| 5,331,346 A | 7/1994 | Shields et al. |
| 5,406,308 A | 4/1995 | Shiki |
| 5,410,357 A | 4/1995 | Rieger et al. |
| 5,444,495 A | 8/1995 | Takahama et al. |
| 5,459,520 A | 10/1995 | Sasaki |
| 5,459,521 A | 10/1995 | Usami |
| 5,469,223 A | 11/1995 | Kimura |
| 5,473,381 A | 12/1995 | Lee |
| 5,528,305 A | 6/1996 | Kim |
| 5,534,934 A | 7/1996 | Katsumata et al. |
| 5,534,936 A | 7/1996 | Kim |
| 5,555,027 A | 9/1996 | Takeuchi |
| 5,600,347 A | 2/1997 | Thompson et al. |
| 5,610,942 A | 3/1997 | Chen et al. |
| 5,642,168 A | 6/1997 | Masaki |
| 5,739,867 A | 4/1998 | Eglit |
| 5,828,415 A | 10/1998 | Keating et al. |
| 5,850,227 A | 12/1998 | Longhenry et al. |
| 5,905,536 A | 5/1999 | Morton et al. |
| 5,912,710 A | 6/1999 | Fujimoto |
| 5,914,753 A | 6/1999 | Donovan |
| 6,002,446 A | 12/1999 | Eglit |
| 6,054,980 A * | 4/2000 | Eglit ..................... 345/204 |
| 6,147,668 A | 11/2000 | Eglit |
| 6,151,079 A | 11/2000 | Nagata et al. |
| 6,166,772 A | 12/2000 | Voltz et al. |
| 6,177,922 B1 | 1/2001 | Schiefer et al. |
| 6,232,952 B1 | 5/2001 | Eglit |
| 6,380,979 B1 * | 4/2002 | Tokoi et al. ............... 348/458 |

FOREIGN PATENT DOCUMENTS

| | | |
|---|---|---|
| EP | 0 534 220 A2 | 3/1993 |
| EP | 0 865 020 A2 | 9/1998 |
| EP | 0 865 020 A3 | 5/1999 |
| JP | 63020847 A2 | 1/1988 |
| JP | 1-241745 | 9/1989 |
| JP | 1241745 A2 | 9/1989 |
| JP | 5241510 A2 | 9/1993 |
| JP | 8-279947 | 10/1996 |
| JP | 8279947 A2 | 10/1996 |
| JP | 10334227 A2 | 12/1998 |

* cited by examiner

METHODS AND APPARATUS FOR BRIDGING DIFFERENT VIDEO FORMATS

BACKGROUND OF THE INVENTION

1. Field of the Invention

The present invention relates to the process of bridging a video signal from one format to another; and more particularly to processes and structures used in integrated circuits provided for that purpose.

2. Description of Related Art

There is an on-going transition from raster-scan CRT display devices to pixel-based displays, like liquid crystal display LCD monitors, plasma TVs and projection TVs. Pixel-based display devices have strict timing specifications, typically stricter then the typical cathode ray tubes CRT's used in standard televisions and computer monitors.

Conditions that must be met for successful bridging include the forcing of the input frame rate iFR to match the output frame rate oFR, and that the buffer used during the bridging not be subject to overflow or underflow conditions. Further it is desirable that the buffer used for bridging be small as possible to save each chip area and implementation costs. Finally, the parameters for the output video stream must conform to the physical limitations of the output display device, which will have minimum and maximum values as outlined above. The following parameters are involved in bridging the formats.

Fid—the frequency of the pixel clock for the input video stream.
iV—the number of input lines
iVDE—the number of displayed input lines
iH—the number of input pixels per line
iHDE—the number of displayed input pixels per line
iFR—the input frame rate
Fod—the frequency of the pixel clock for the output video stream.
oV—the number of output lines
oVDE—the number of displayed output lines
oH—the number of output pixels per line
oHDE—the number of displayed output pixels per line.
oFR—the output frame rate.
Min/max Fpd—the specified range of frequencies of the pixel clock for the output video device.
Min/max pV—the specified range for the number of output lines for the output device
Min/max pVDE—the specified range for the number of displayed output lines for the output device
Min/max pH—the specified range for the number of output pixels per line for the output device
Min/max pHDE—the specified range for the number of displayed output pixels per line for the output device
Min/max pFR—the specified range for the output frame rate for the output device.

Difficulties in bridging the formats arise because of non-integer ratios of the input frame size to the output frame size, as expressed for example in the parameters iV, iVDE, iH and iHDE, for the input video stream and oV, oVDE, oH and oHDE for the output video stream. The difficulties are aggravated by the limitations of matching input and output clock rates used for the bridging.

Prior art techniques for managing the problems that arise because of the finite precision for generation of the output clock Fod and/or the use of spread-spectrum effects for the pixel clocks involve using a larger frame or line buffer. However, such buffers are a typically implemented using SRAM or SDRAM memory to accommodate the speed differences and variations. Because SRAM and SDRAM memory is expensive to implement, it is desirable to keep the buffer a small as possible.

In order to keep the buffer small while preventing overflow or underflow, the system must maintain the distance between input and output active pixel streams constant within a small range. Thus the system must tend to keep the elapsed time for the input active pixels equal to the elapsed time for the output active pixels.

Consider the following equations:

$$iH*iVDE*(1/Fid) = oH*oVDE*(1/Fod) \qquad \text{eq-1}$$

$$Fod = (oH*oVDE*Fid)/(iH*iVDE) \qquad \text{eq-2, derived from eq-1}$$

$$oH = (iH*iVDE*Fod)/(oVDE*Fid) \qquad \text{eq-3, derived from eq-1}$$

Equation 1 illustrates the relation that results from a requirement that the buffer not overflow or underflow during active lines in a frame. That is the number of pixels per line on the input iH times the number of active lines on the input iVDE (input lines during which display enable is asserted) divided by the frequency of input clock Fid, should be equal to the number of pixels per line on the output oH times the number of active lines on the output oVDE (output lines during which display enable is asserted) divided by the frequency the output clock Fod. Equation 2 illustrates a computation of the frequency the output clock required to achieve the relation of equation 1. Equation 3 illustrates a computation of the number of pixels in the output lines that is needed to achieve the relation of equation 1.

For a typical video scaling bridge, the processor waits for the input video stream to fill two active scan lines into line buffers before the output stream begins unloading output active pixels. Thus, a minimum of two lines of memory is required for the line buffer in a typical system.

However, the output clock frequency Fod cannot be precisely controlled. It is generated by a clock source that translates a reference clock to the output clock frequency Fod, using a frequency divider or other component having a finite precision. In some embodiments, the output clock frequency Fod is intentionally dithered to induce so-called spread spectrum effects that reduce electromagnetic interference. Therefore, it can be seen from equations that the value of oH cannot be precisely controlled.

Consider an example in which iH is 1040, iV is 660, iHDE is 800, iVDE is 600, and the frequency of input clock is 50 MHz, while the desired output parameters include oH of 1316, oV of 1120, oHDE of 1280, oVDE of 1024, and the frequency of the output clock of about 108 MHz. In one embodiment the actual frequency of the output clock Fod is produced using a crystal oscillator reference clock of 14.318 MHz, and using a frequency divider having a value for example of 15/2. Therefore we have:

$$Fod = 15/2 * 14.318 \text{ MHz} = 107.385 \text{ MHz}$$

Applying equation 3, we have the number of pixels per line oH at this Fod, as follows:

$$oH = (1040*600*107.385)/(1024*50) = 1308.755$$

This suggests that the output number of pixels per line oH should be 1309, which differs from the ideal of 1316. Given 1024 active output lines, and a requirement that the input frame rates match, we can compute the number of extra lines needed in the buffer for compensating the speed difference as follows:

$$1024*(1-(\text{actual-}Fod*1316)/(\text{ideal-}Fod*1309)) = 0.2 \qquad \text{eq-4}$$

Thus, in this example, the line buffer needs to be extended by 0.2 lines to accommodate the actual output frequency. If one or both of the input pixel clock Fid or the output pixel clock Fod is not constant, but is dithered, for example, with a range is of 0.5 to 1.0 percent variation to reduce electromagnetic interference effects, then the buffer needs to be further increased in size. In a worst-case where both clocks are dithered by one percent, then two percent of the number of active lines the output device oVDE need to be provided in the buffer for the purposes of accommodating these variations. Thus, for our example in which there are 1024 active output lines, an additional 20.48 lines of buffer memory would be required. Such an additional buffer would take a huge amount of area on the bridge chip, and make it much more expensive.

Also the requirement that input frame rate iFR equal output frame rate oFR, which means input frame period=output frame period, including both inactive and active lines, yields the following equations:

$$iH*iV*(1/Fid)=oH*oV*(1/Fod) \qquad \text{eq-5}$$

$$oV=(iH*iV*Fod)/(oH*Fid) \qquad \text{eq-6}$$

As can be seen from equation 6, the number of output scan lines in a frame may be not an integer number, resulting in a residue scan line that may be too short for the destination display device.

Taking for example the Sharp SXGA LCD panel as the output display device, we compute the bridging parameters in two steps:

Step 1: In order to prevent overflow/underflow for bridge within a line buffer, we should choose:
 desired Fod=(1024*1316*50 MHz)/(600*1040)= 107.9795 . . . MHz
However, we have no infinitely precise Fod clock generator, thus
 Actual Fod=15/2*14.318 MHz=107.385 MHz
 Adjusted oH=1309
Step 2: In order to meet iFR=oFR, the ideal number of output scan lines is as follows:

$$\text{Ideal } oV=(107.385 \text{ MHz}*1040*660)/(50 \text{ MHz}*1309)=1126.189 \text{ lines} \qquad \text{eq-7}$$

Thus, the residue width is 0.189 line, which means that the residue line has:

$$0.189*1309 \sim= 247 \text{ pixels} \qquad \text{eq-8}$$

This 247 pixel width violates the minimum line width limitation of display device, in which the minimum line width is 648 clocks*2=1296 pixels. Thus, the overall system can not meet the three requirements (1) that the line buffer not overflow/underflow, (2) that the frame rate of the input match the frame rate of the output, and (3) that the residue line not be smaller than the device minimum.

Taking for another example, the Fujitsu PDP as the physical display device, we determine the bridging parameters as follows:

Step 1: Compute output pixel clock frequency as follows, selecting 1080 pixels per scan line and around 600 lines per frame:
 Desired Fod=1080*600*72/2=23.328 MHz (divided by 2 is because 2 pixels per clock)
 Actual Fod=13/8 *14.318 MHz=23.267 MHz
Step 2: In order to meet iFR=oFR, the ideal number of output scan lines is
 oV=(23.267 MHz*2*1040*660)/(50 MHz*1080)=591.49 lines The residue line width in time, is
 0.49*(1080/2)/23.267=11.37 μsec<22.7 μsec,
 where 22.7 μsec is the minimum acceptable line width for the display device.

The residue line calculation can get even worse if the input pixel clock Fid is less constant, such as clocks from a VHS-player or broadcast TV/HDTV. In these cases, the width of residue line is unstable due to an unstable Fid.

Thus, the prior art systems generate residue lines with either a fixed or variable width. If the number of output lines oV derived from the input video stream, given the precision of the output clock, is not an integer, a residue line of roughly fixed width is generated from video sources like a VGA formatted video stream with a relatively stable input pixel clock Fid. The derived number of output lines oV can vary, ranging for example from 1000.3 to 1001.6 if the speed of input pixel stream has significant fluctuation. For example, VHS player, broadcast TV or high-definition TV HDTV formatted streams may have pixel clocks which fluctuate. The residue line problem is worse where the destination device is unable to handle lines that are less than a minimum specified parameter.

Another problem which occurs in the prior art arises from the fact that the actual output frequency for the display Fod will fluctuate simply because of the short-term variation of the clock generator. For example, a typical phase locked loop clock generator may fluctuate plus or minus 0.5 percent over relatively short terms. Prior art systems address this problem by increasing the size of the line buffers, increasing chip cost.

Furthermore, in the scaling of the input video frame to the output video frame, the number of output lines oV or the number of output pixels per line oH may be required to exceed the maximum number specified for the output device. Thus, as derived above in equation 7, the number of output lines oV for the Sharp TFT LCD device was determined to be 1126. However, the maximum number of lines allowed on the device is 1080. This causes unstable display output.

It can be seen that the problem of bridging an input video format to an output video format in an economical manner which provides stable display output for a range of output devices is complex. As the number of types of output device increases, the problem is becoming more prevalent. It is desirable therefore to provide techniques adaptable to integrated circuit implementations for bridging video formats.

SUMMARY OF THE INVENTION

The present invention provides a video format bridge that employs a plurality of techniques to insure that the line buffer does not suffer underflow or overflow conditions, that the output frame rate matches the input frame rate, to handle the problem of residue lines, to address fluctuations in the input and output clock rates, and to allow adjustment of the ratio of the input and output the number of lines per frame or number of pixels per line so that output device specifications are not exceeded. In one embodiment, a single integrated circuit is provided which is adapted to perform a plurality of techniques, and includes resources by which the user is able to enable and disable such techniques as needed for the particular bridging operation being executed.

One embodiment of the invention comprises an input for input video stream and an output for an output video stream for a physical output display. A buffer stores input pixels at the input clock rate and outputs pixels for the output video stream. A reference clock source and a clock generator are included which produce timing signals used for the output video stream from the reference clock. The reference clock may be a clock derived from the input video stream, or from an independent source, such as a crystal oscillator. Bridge logic in this embodiment produces an output video stream which has an output frame rate matching the input frame rate, and in which the output frame has at least one of a variable number of pixels per line within an output frame, and a variable number of lines per frame among output frames in a set of more than one output frames.

According to one technique of the present invention, the bridge logic produces a residue number of pixel clock cycles in a residue line within the output frame, the residue number being less than a minimum number of pixels per line specified for the output display. The bridge logic distributes in the residue number of output pixels within the output frame using a variable number of pixels per line, while maintaining a fixed number of lines per frame or a variable number of lines per frame.

According to another technique, the bridge logic accumulates the residue output pixels across multiple output frames until a number of residue pixel clock cycles is accumulated than is greater than a minimum number of pixels per line, and then adds an extra line to an output frame to consume the residue.

In yet another technique, the bridge logic determines a normalized distance between the input video stream and the output video stream at a position in an output line, and adjusts the number of pixels per output line in response to the normalized distance. For example, the bridge logic increases the number of pixels per line if the normalized distance at the beginning an output line is less than a minimum distance, and decreases the number of pixels per line if the normalized distance at the beginning an output line is greater than a maximum distance. If the normalized distance is between the minimum and maximum distances, then the logic does not change the number of pixels per line.

One technique by which frame rates are caused to match which is executed by the bridge logic includes determining the number of lines plus a number of pixels in input video stream as an input delay, counting input delay after an input vertical synchronization clock cycle or other fixed point in the input video stream, and issuing a "force" signal when input delay is reached. The first active line in a frame in the output video stream is started in synchronization with the output clock signal and after the force signal, such as upon the next output horizontal synchronization signal. The number of pixels in the input delay is zero in some embodiments and non-zero in some embodiments, allowing for more precision in the specification of input delay. Likewise the number of input lines in the input delay may be zero in some embodiments.

According to another technique, the bridge logic includes resources to set a lower bound input delay and upper bound input delay, wherein the lower and upper bound input delays are respective numbers of lines plus numbers of pixels in input video stream after an input vertical synchronization clock cycle or other fixed point in the input video stream. The first active line in a frame in the output video stream starts after a "back porch number" of lines in output video stream after the output vertical synchronization clock cycle or other fixed point in the output video stream. A number of "front porch" lines is inserted in the output video stream after a last active line in the frame, and before the vertical synchronization signal starting a next frame, in the output video stream. The number of front porch lines is adjusted if the first active line in the frame in the output video stream is outputted before the lower bound input delay (output frame period is too short) or after the upper bound input delay (output frame period is too long). In this way relative timing of the input video stream and output video stream can be adjusted with variations in the output and input clocks.

In one embodiment, an integrated circuit bridging device includes a plurality of registers, counters and other hardware logic combined with a general-purpose processor which executes software, that are configurable to provide selected bridging functions as discussed above.

The invention is also embodied by methods for bridging video formats. One method according to the invention includes:

generating an output clock signal for the display, and using the clock signal producing a pixel clock determining pixel timing for the output video stream, a horizontal synchronization clock determining a line length in the output video stream, and a vertical synchronization clock determining a frame length in the output video stream;

causing an output frame supplied to the display using said clock signal to have a period substantially the same as a frame in the input video stream;

determining a length, in for example a number of pixel clock cycles, of a residue line within the output frame; and if the length of the residue line is less than a minimum line length, then distributing pixel clock cycles of the residue line to lines in the frame, by providing a number of lines having a first number of pixel clock cycles, and a number of lines having a second number of pixel clock cycles different taan the first number.

Another method according to the present invention includes:

generating an output clock signal for the display, and using the clock signal producing a pixel clock determining pixel timing for the output video stream, a horizontal synchronization clock determining a line length in the output video stream, and a vertical synchronization clock determining a frame length in the output video stream;

causing an output frame supplied to the display using said clock signal to have a period substantially the same as a frame in the input video stream by determining a number of lines plus a number of pixels in the input video stream as an input delay, counting the input delay in the input video stream, and issuing a force signal when the input delay is reached, and starting a first active line in a frame in the output video stream synchronized with the output clock signal, in a next line after the force signal.

A third method according to the present invention includes:

generating an output clock signal for the display, and using the clock signal producing a pixel clock determining pixel timing for the output video stream, a horizontal synchronization clock determining a line length in the output video stream, and a vertical synchronization clock determining a frame length in the output video stream;

causing an output frame supplied to the display using said clock signal to have a period substantially the same as a frame in the input video stream; and determining a number of frames in a set of frames in the output video stream in which a number of pixel clock cycles in residue lines of the frames in the set reaches a minimum number, and then inserting an extra line in one frame of said set of frames.

A fourth method according to the present invention includes:

generating an output clock signal for the display, and using the clock signal producing a pixel clock determining pixel timing for the output video stream, a horizontal synchronization clock determining a line length in the output video stream, and a vertical synchronization clock determining a frame length in the output video stream;

setting a lower bound input delay and an upper bound input delay, wherein the lower and upper bound input delays are respective numbers of lines plus numbers of pixels in the input video stream;

outputting a first active line in a frame of the output video stream after a back porch number of lines in the output video stream after an output vertical synchronization clock cycle;

inserting a front porch number of lines in the output video stream after a last active line in said frame of the output video stream; and adjusting the number of front porch lines if the first active line in said frame in the output video stream is outputted before the lower bound input delay or after the upper bound input delay.

A fifth method according to present invention includes:

generating an output clock signal for the display, and using the clock signal producing a pixel clock determining pixel timing for the output video stream, a horizontal synchronization clock determining a line length in the output video stream, and a vertical synchronization clock determining a frame length in the output video stream;

counting input active lines and pixels to determine a position in the input frame and output active lines and pixels to determine a position in the output frame;

during outputting of active output lines, determining a normalized distance between the position in the input frame and the position in the output frame; and adjusting the number of pixels per line according to the normalized distance.

The methods summarized above, and other methods described in more detail below are used in various combinations as necessary to meet the needs in particular bridging operation.

The present invention provides tools for a bridging device suitable for use for bridging a wide variety of input and output formats. According to the present invention, given the parameters of an input video stream (Fid, iV, iVDE, iH, iHDE, iFR), and given that the parameters of the output video stream (Fod, oV, oVDE, oH, oHDE, oFR) are not the same as those of the input video stream, a bridging process is able to meet the requirements that the input frame rate iFR equals the output frame rate oFR, the output video stream conforms to the limitations of the output display physical device (Fpd, pV, pVDE, pH, pHDE, pFR), and that there are no line buffer (or frame buffer) overflow or underflow conditions.

Particular aspects of the present invention are described in the claims, specification and drawings.

DETAILED DESCRIPTION

Figure 1:
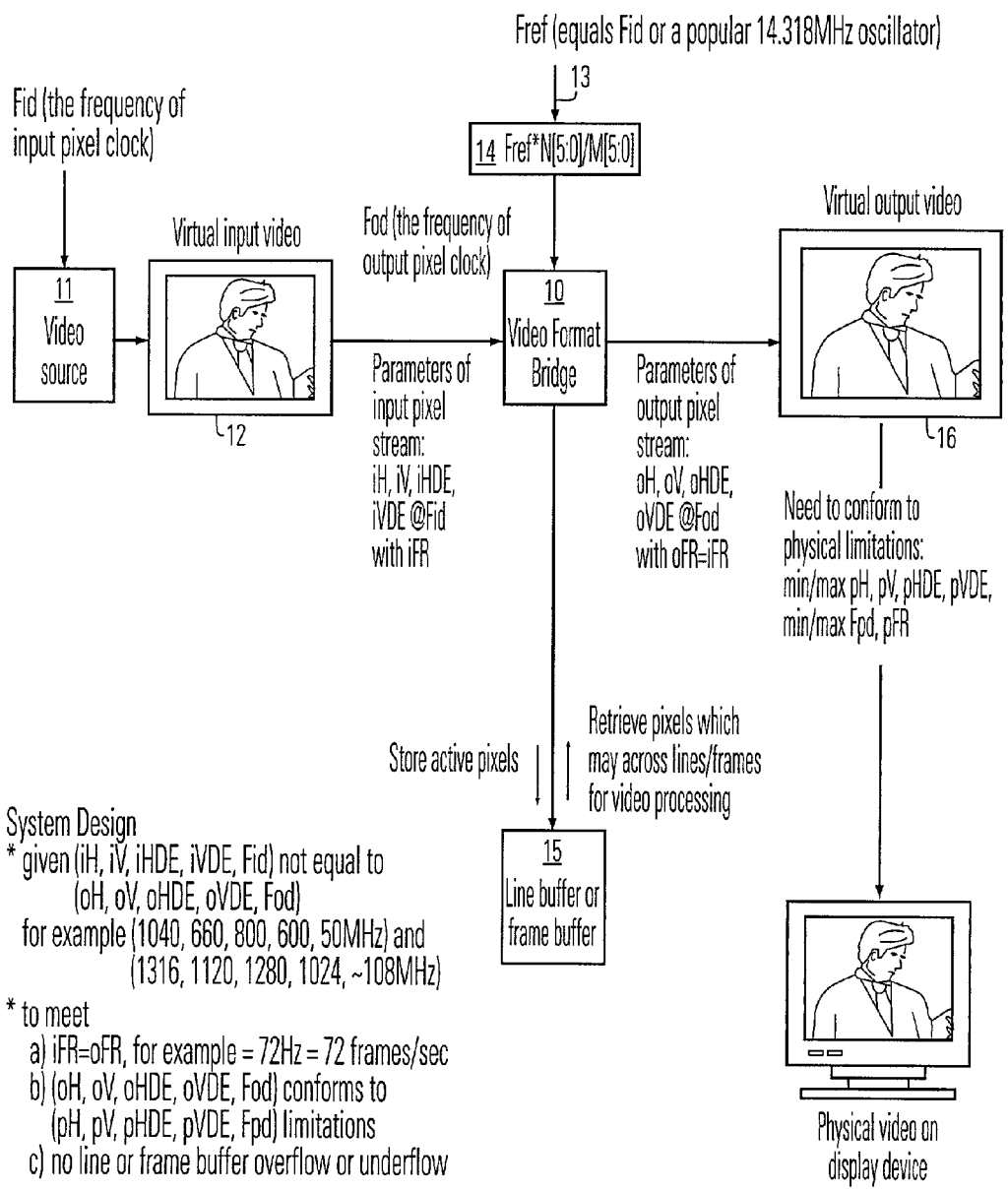
FIG. 1 is a block diagram of a system including video format bridge according to the present invention.

A detailed description of embodiments of the present invention is provided with respect to the figures. FIG. 1 is a basic illustration of system that includes a video format bridge 10 according to the present invention. The system accepts input from a video source 11, which is characterized as a virtual input video frame 12. The video source 11 has a input pixel clock Fid, and outputs the input video stream with the parameters iH, iV, iHDE, iVDE for a given input pixel clock Fid and input frame rate iFR.

A reference clock is supplied on line 13 to the clock generator 14. The reference clock may be supplied by crystal oscillator, such as the popular 14.318 MHz oscillator in common use, or may be derived from the input pixel clock Fid. The clock generator is implemented using a frequency divider having six bits of accuracy in this example. Thus, the clock frequency of the output video stream Fod is equal to the reference frequency Fref times the six bit value N[5:0] divided by the six bit value M[5:0]. The values M and N define a finite precision for generation of the output pixel clock Fod. Greater precision reduces the matching problems described above, but does not eliminate them in all cases.

The video format bridge 10 receives the output clock Fod and the input video stream 12 as inputs. A line buffer or frame buffer 15 coupled to the video format bridge 12 is used to store active pixels from the input video stream. The video format bridge 10 retrieves pixels from the buffer 15, which may cross lines or frames, for video processing to produce an output pixel stream characterized by the virtual output video frame 16. The parameters of the output pixel stream include oH, oV, oHDE and oVDE at the output pixel clock rate Fod, where the output frame rate oFR is substantially equal to the input frame rate iFR.

According to the present invention, the video format bridge 10 adjusts the number of pixels per line oH within an output frame or the number of lines per frame oV within a set of output frames, to handle timing and buffering problems discussed above.

Figure 2:
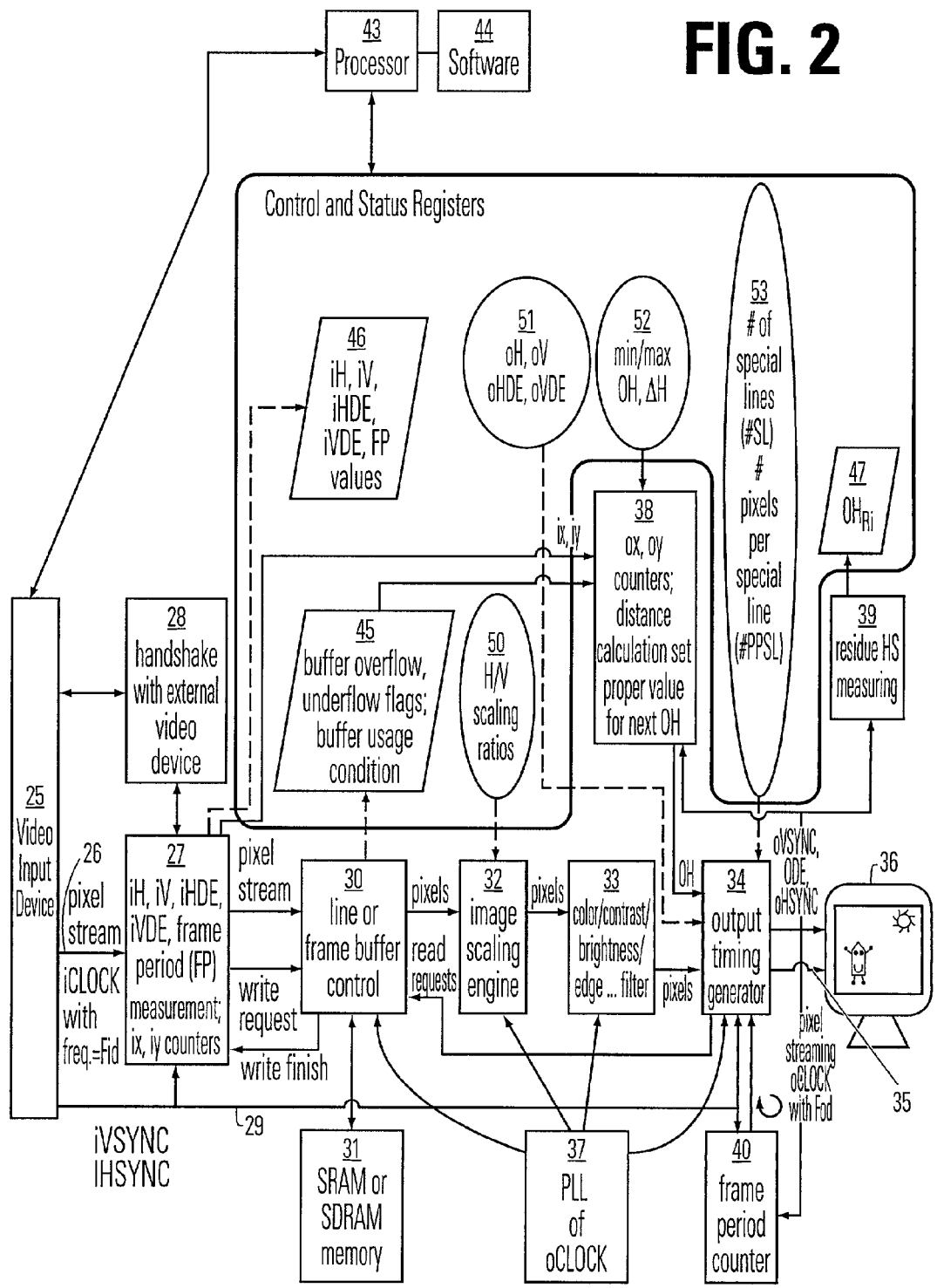
FIG. 2 is a simplified block diagram of the video format bridge according to one embodiment of the present invention.

FIG. 2 is a simplified block diagram of the video format bridge that provides resources for executing a variety of bridging processes. In FIG. 2, a video input device 25 supplies a pixel stream on line 26 to measurement logic 27, and executes a handshake protocol with interface logic 28. Furthermore, the video input device 25 supplies the input vertical sync and the input horizontal sync clock signals on line 29. The pixel stream 26 has an input clock associated with it that is equal to the input pixel clock Fid. The measurement logic 27 determines the parameters of input video stream (iH, iV, iHDE, iVDE), determines the input frame period FP, and includes ix and iy counters that indicate a position in the input video flame. The measurement logic 27 transmits the pixel stream to the line or frame buffer control block 30, which manages transfer of data into the buffer 31, implemented using SRAM or SDRAM memory in this embodiment. The measurement logic 27 in this embodiment also manages the write request and write finish handshaking between the line or frame buffer control block 30 and the input pixel stream. The buffer control block 30 transfers pixels out of the memory 31 to image scaling engine 32 which in turn supplies the pixels to image processing logic 33, which performs such adjustments as color content, contrast, brightness, edge filtering, and the like. The image processing logic 33 supplies pixels to an output timing generator 34 which in turn generates the output pixel stream on line 35 to the destination display device 36.

The output timing generator 34 generates the output vertical sync clock and the output horizontal sync clock, as well as an output display enable signal along with the streaming pixels at the output pixel clock rate Fod on line 35. The output timing generator 34 also issues read requests to the buffer control block 30.

An output clock generator 37 (phase locked loop in this example) is coupled to the buffer control block 30, the image scaling engine 32, the image processing logic 33, and the output timing generator block 34.

A measurement block 38 is coupled with the output timing generator 34 and with the measurement block 27, and includes ox and oy counters to indicate a position in the output frame, and includes logic to compute the normalized distance between the position in the output frame and the input frame. A measurement block 39 measures the length of residue lines in the output frame. A frame period counter 40 is coupled with the output timing generator 34 and the measurement block 39, and receives the input vertical sync and input horizontal sync signals on line 29.

Processor 43 and software routines 44 communicate with the input video device 25 and the control and status registers, so that software routines are used in the bridging processes, to an extent desired for a given implementation.

Control and status registers which are written by hardware in this example include the register set 45 which includes buffer overflow and underflow flags and buffer use condition registers written by the buffer control block 30. Register set 46 stores the parameters of the input pixel stream from the measurement block 27. Register set 47 stores the length of the residue line produced by the residue line measurement block 39. Control and status registers that store values produced by the processor 43 under control of the software routines 44 include register set 50 that supplies the scaling ratios for the input and output frames, register set 51 which provides parameters for the output pixel stream, register set 52 which provides parameters used in the distance locking process, and register set 53 which provides parameters for adjusting the number of pixels per line.

Various processes for which the system of FIG. 2 is adapted are described detail below. It will be understood that the allocation of logic between hardware and software can be changed as suits the needs of particular implementations.

Figure 3:
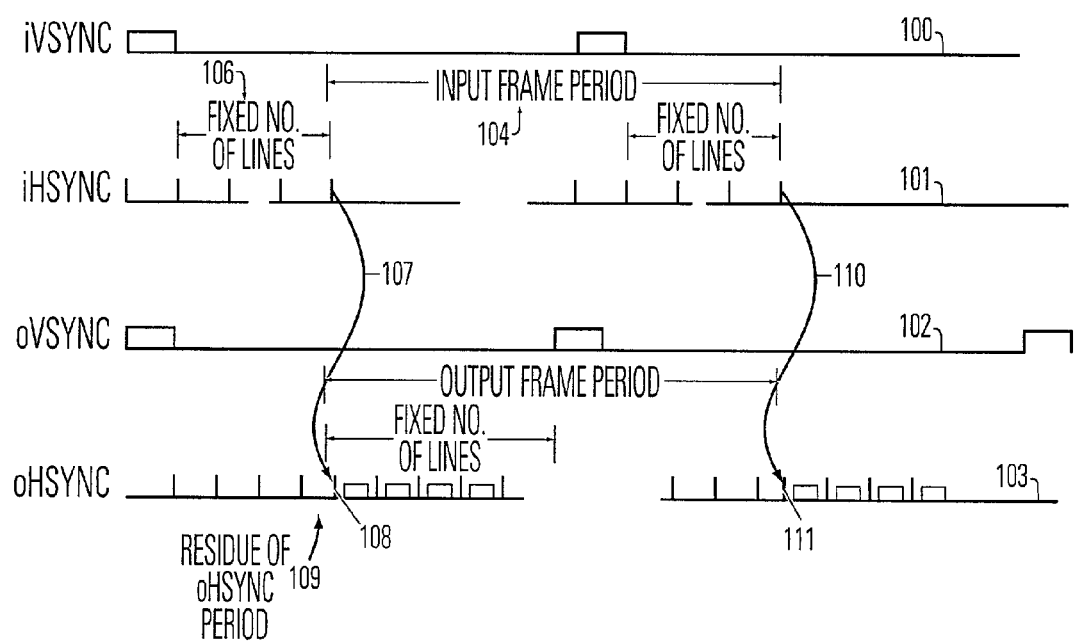
FIG. 3 is a timing diagram of a prior art approach to video format bridging.

FIG. 3 is a timing diagram illustrating a prior art approach used in the integrated circuit MX88L284 manufactured by Macronix International Co. Ltd. The first trace 100 shows the input vertical sync clock. The second trace 101 shows the input horizontal sync clock. The third trace 102 shows the output vertical sync clock. The fourth trace 103 shows the output horizontal sync clock with output display enable signals indicated in active lines. As mentioned above, the output frame period 104 is forced to match the input frame period 105. In this prior art approach, a fixed number of input horizontal sync pulses 106 is counted. After the fixed number, a "force" signal 107 is issued which causes the output horizontal sync clock 108 to be synchronized with the input horizontal sync clock. This causes a residue output line interval 109 which is shorter than the normal line interval. The output frame has a determinate number of output lines. During a next input frame, the force signal on line 110 is issued at the same fixed number of input lines after the input vertical sync, causing resynchronization of the output horizontal sync signal 111 and a second residue output line interval. As can be seen, the residue output line interval varies in length from frame to frame. The output device may not be able to accept the forced timing of the output horizontal sync signal at it results in residue lines having unstable lengths. If the destination device cannot handle the unstable lengths of the residue lines, this prior art device is unsuitable as a bridging solution.

Figure 4:
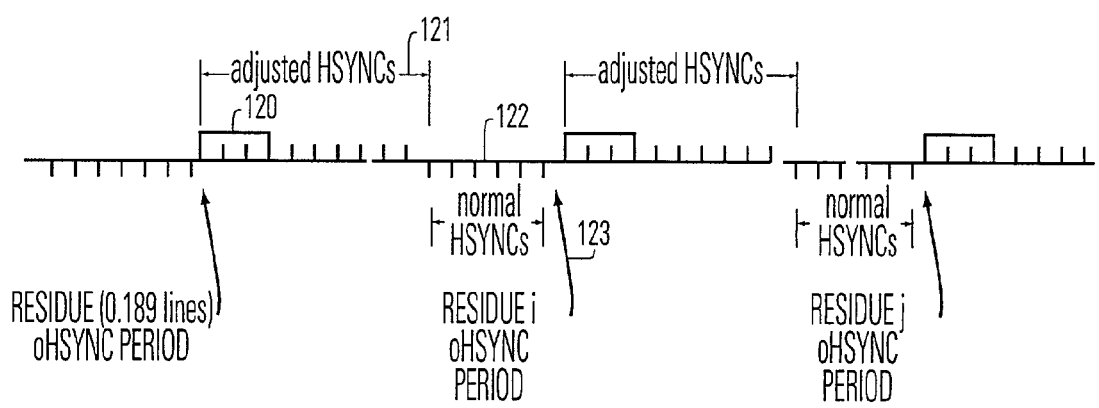
FIG. 4 is a timing diagram showing the process according to the present invention for distributing residue line pixels among lines within a frame.

FIG. 4 is a timing diagram which illustrates one approach according to the present invention of making sure that the residue line lengths are within the specifications of the output device. Thus, FIG. 4 shows a trace having normal horizontal sync intervals 122 and adjusted horizontal sync intervals 121, where normal horizontal sync intervals have a first number of pixels per line, and adjusted horizontal sync intervals have a different number of pixels per line. Thus, when the output vertical sync signal 120 is issued, according to this example, a residue output horizontal sync period is detected. The length of the residue output horizontal sync period is applied to adjusting the horizontal sync periods of the frame so that the residue pixels are distributed among the lines in the frame. Thus, a number of adjusted horizontal sync signals are issued during interval 121 and number of normal horizontal sync issued during interval 122, so that a non-integer average number of pixels per line may be implemented in a single frame. This process is repeated frame by frame so that the residue interval is controlled.

In this example, with a residue of 0.189 output lines, the interval 121 of adjusted horizontal sync periods will have 169 lines with 1311 pixels each, for example. The normal horizontal sync periods during interval 122 have 1309 pixels per line. The residue sync period 123 will be greater than or equal to about 0.9 lines, safely within the specifications of the output device.

Figure 5:
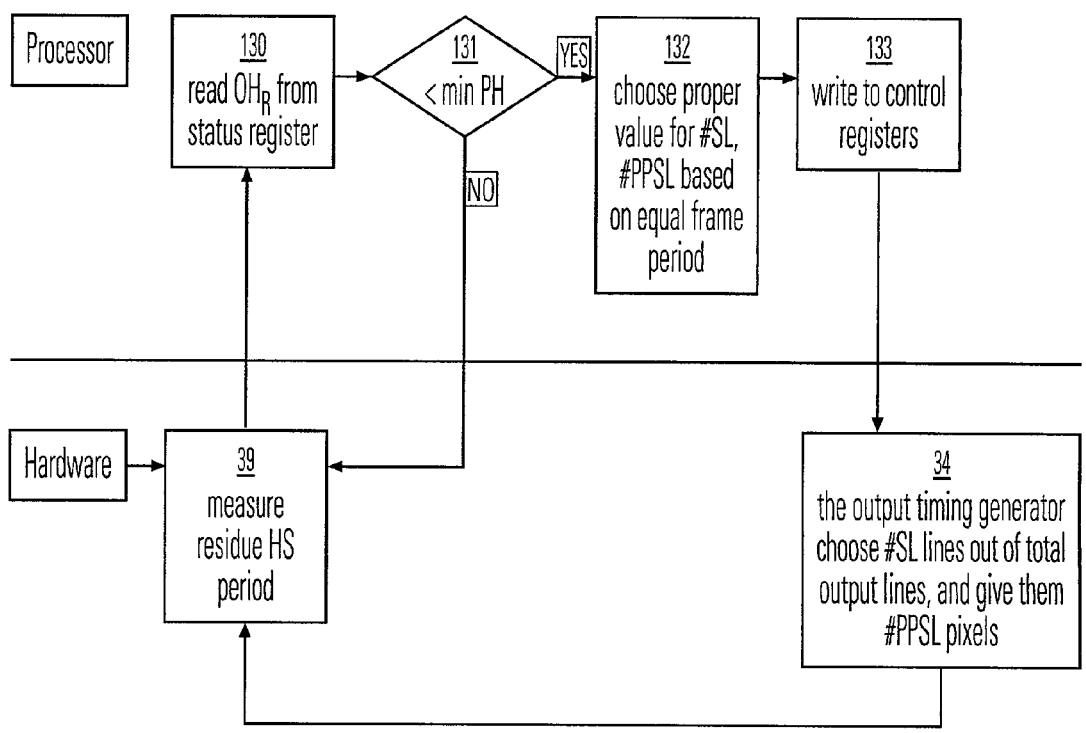
FIG. 5 is a simplified logic diagram showing one implementation of the process of FIG. 4.

FIG. 5 illustrates one process for distributing a residue horizontal sync interval among the lines of a frame as shown in FIG. 4, using a video format bridge such as that shown in FIG. 2. In this example, the hardware involved in the process includes a logic measurement unit 39 which measures the residue horizontal sync interval. Also, output timing generator 34 chooses the number of special lines of the total number of lines and computes the number of pixels per special line in order to distribute the residue interval over the frame. The processor reads the number of pixels in the residue line from the status register, (block 130), and determines whether that number is less than a minimum specified for this physical device (block 131). If it is not less than the minimum, the process loops to block 39 to continue with a next frame. If at block 131, the residue line is too short, then the processor computes the proper value for the number of special lines to be used in the interval of the next frame having adjusted line lengths, and the number of pixels per special line in order to distribute the residue among the lines in frame (block 132). These values are written to the control registers (block 133). The output timing generator 34 uses these values in generating the output pixel stream.

Figure 6:
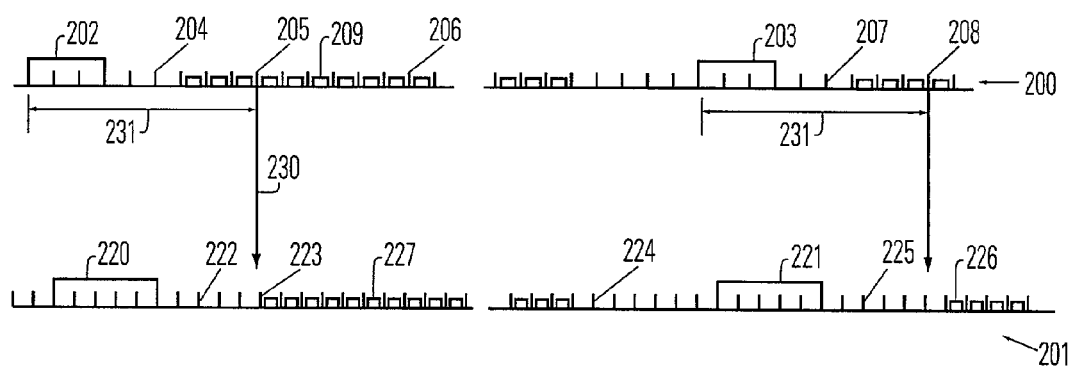
FIG. 6 is a timing diagram showing a video format bridging process for synchronizing input and output frames with a fixed input delay.

Accordingly, with reference to FIGS. 4 and 5, it can be understood that the bridging processes available in the integrated circuit of FIG. 2 include the process by which there is a stable number of output lines per frame, represented by a fixed number of output horizontal sync signals per vertical sync signal, with a variable number of output pixels per line, also represented by a variable number of output pixel clock signals per horizontal sync signal. FIG. 6 is a timing diagram illustrating the manner in which the input and output frame rates are matched, using an algorithm with a fixed input delay, which can be dynamically computed to account for variations in the clocks. The process of FIG. 6 is suitable for use with the process described with reference to FIGS. 4 and 5.

In FIG. 6, the input tining is illustrated along trace 200 and the output timing is illustrated along trace 201. The input timing includes input vertical sync signals 202 and 203, a plurality of horizontal sync signals 204, 205, 206, 207 and 208 for examples, and a plurality of input display enable signals represented by the shapes 209, which are between horizontal sync signals. Likewise, the output timing includes output vertical sync signals 220 and 221, output horizontal sync signals 222, 223, 224, 225, and 226 for examples, and the output display enable signals represented by the shapes 227 between the output horizontal sync signals. In this embodiment, a force signal 230 is issued after a fixed input delay 231 after the input vertical sync pulse 202. The input delay is a predetermined number of horizontal sync signals plus pixel clock signals, where the number of pixel clock signals may be nonzero for greater precision. In this example, the input delay is equal to the number of input horizontal sync. Detection of the input delay results in issuing of the force signal 230 synchronized with the input horizontal sync signal 205. The input delay is set at a value which between a lower bound and upper bound that are defined by the performance of the line or frame buffer, so that underflow or overflow conditions do not occur. The same input delay is implemented for each frame. Thus, the input delay 231 after the vertical sync pulse 202 causes issuing of the force signal 230 upon the input horizontal sync signal 208.

As can be seen in the drawing, the force signal 230 which is synchronized with the input horizontal sync pulse 205 occurs just before the output horizontal sync pulse 223. The output frame is initiated on the next output horizontal sync pulse after the force signal 230, or in this example on the output horizontal sync pulse 223. In the next frame after the output vertical sync pulse 221, the force signal 230 occurs prior to the output horizontal sync signal 226. Thus the first output active line with display enable begins after the output horizontal sync pulse 226.

Figure 7:
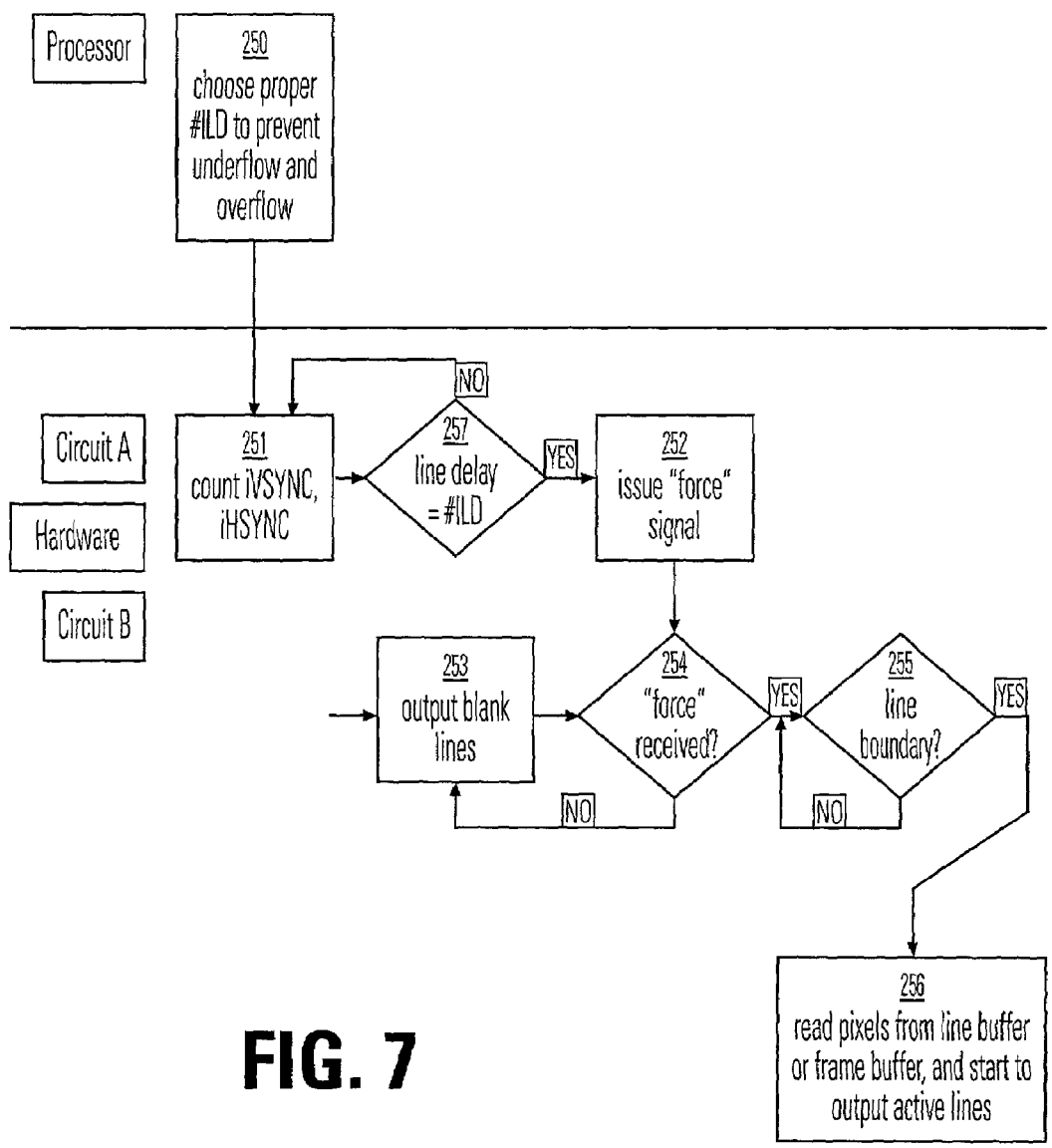
FIG. 7 is a simplified logic diagram showing one implementation of the process of FIG. 6.

FIG. 7 illustrates the processes executed to implement the method described with reference to FIG. 6, using a video format bridge such as that in FIG. 2. The processor executes a program to choose the proper input line delay that prevents underflow and overflow of the buffer (block 250). Hardware counts the input vertical sync pulses and the input horizontal sync pulses (block 251). Hardware logic determines whether the current line delay is equal to the input line delay number specified by the processor (block 257). If the input line delay has not been reached, then the process continues counting. If the input line delay has been reached, then the force signal is issued (block 252). The output timing generator produces blank output lines prior to the force signal (block 253). The process waits for detection of the force signal (block 254). If the force signal is not detected, then the process continues to output blank lines. When the force signal is detected, process determines whether an output line boundary has occurred (block 255). If not, then the process continues to wait for a line boundary, as indicated in this example by an output horizontal sync pulse. When the line boundary is detected, the process begins to read pixels from line buffer or frame buffer, and starts to output active lines (block 256). The input line delay supplied by the processor 250 can be re-computed on a periodic basis to account for variations in clock signals if desired. In a system in which the clocks are stable, this may not be necessary. The different timing in each frame may result in a variable number of lines per frame, but it can eliminate residue lines as described above. Thus, the process of FIGS. 4 and 5, in which a variable number of pixel clock signals between horizontal sync signals can be used with the process of FIGS. 6 and 7, to prevent residue lines that are too short for the output display device, if necessary.

Other processes according to the present invention provide a variable number of output lines per frame across a set of frames in the output video stream, represented by a variable number of output horizontal sync signals per vertical sync signal, with a fixed or variable number of output pixels per line, also represented by a fixed or variable number of output pixel clock signals per horizontal sync signal. One such process operates a manner similar to that described in FIG. 6, except that the residue pixels are accumulated until a number of residue pixel clocks long enough to be presented as an output line is available. When the number of residue pixels is high enough, then an extra line is inserted into a frame. This results in a set of frames within which at least one frame has a different number of lines than the other frames, so that there may be a non-integer average number of lines per frame over the set. In another embodiment, the processor can compute in advance how many frames in a set of frames should have an extra line in order to accommodate the residue pixels which are generated by the mismatching clocks.

Figure 8:
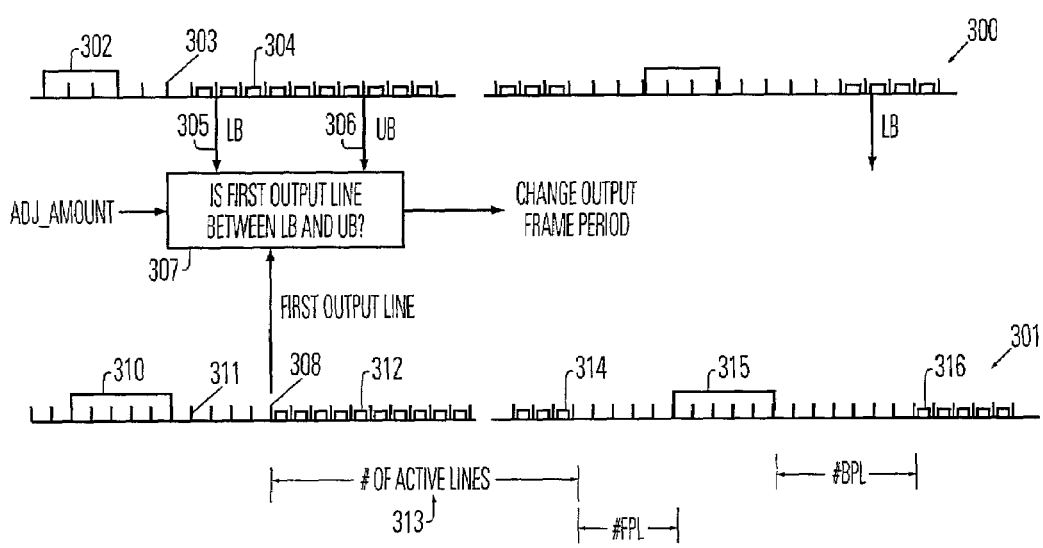
FIG. 8 is a timing diagram showing a video format bridging process for synchronizing input and output frames between a lower and upper bound input delay.

FIG. 8 is a timing diagram which illustrates an alternative process for ensuring that the frame rates match, in the condition that the number of lines per frame may be variable.

In FIG. 8, the input timing is shown on trace 300 and the output timing is shown on trace 301. The input timing includes an input vertical sync signal 302, a plurality of input horizontal sync signals 303, and a plurality of input active lines represented by displayed enable signals 304. According to this technique, a lower bound input delay LB 305 and upper bound input delay UB 306 are specified. Logic 307 determines whether the first active output line 308 is between the lower bound and upper bound values. The process by which logic operates is described below with reference to FIG. 9. The output timing includes output vertical sync signal 310, a plurality of output horizontal sync signals 311 and a plurality of active output lines represented by the display enable signals 312. The number of active lines 313, in which the display enable signals are asserted is determined by the bridging algorithms, and is typically fixed. The number of horizontal sync pulses between the last active line 314 and the leading edge of the next vertical sync pulse 315 is referred to as the number of front porch lines FPL. The number of horizontal sync pulses between the trailing edge of the vertical sync pulse 315 and a first active line 316 is referred to as the number of back porch lines BPL. According to this technique, if the first output line 308 is below the lower bound, then the output frame period is changed by an adjustment amount, for example by adding an extra line in the front porch. Likewise, if the first output line 308 is above the upper bound, then the output frame period is changed by an adjustment amount, for example by eliminating a line from the front porch.

Figure 9:
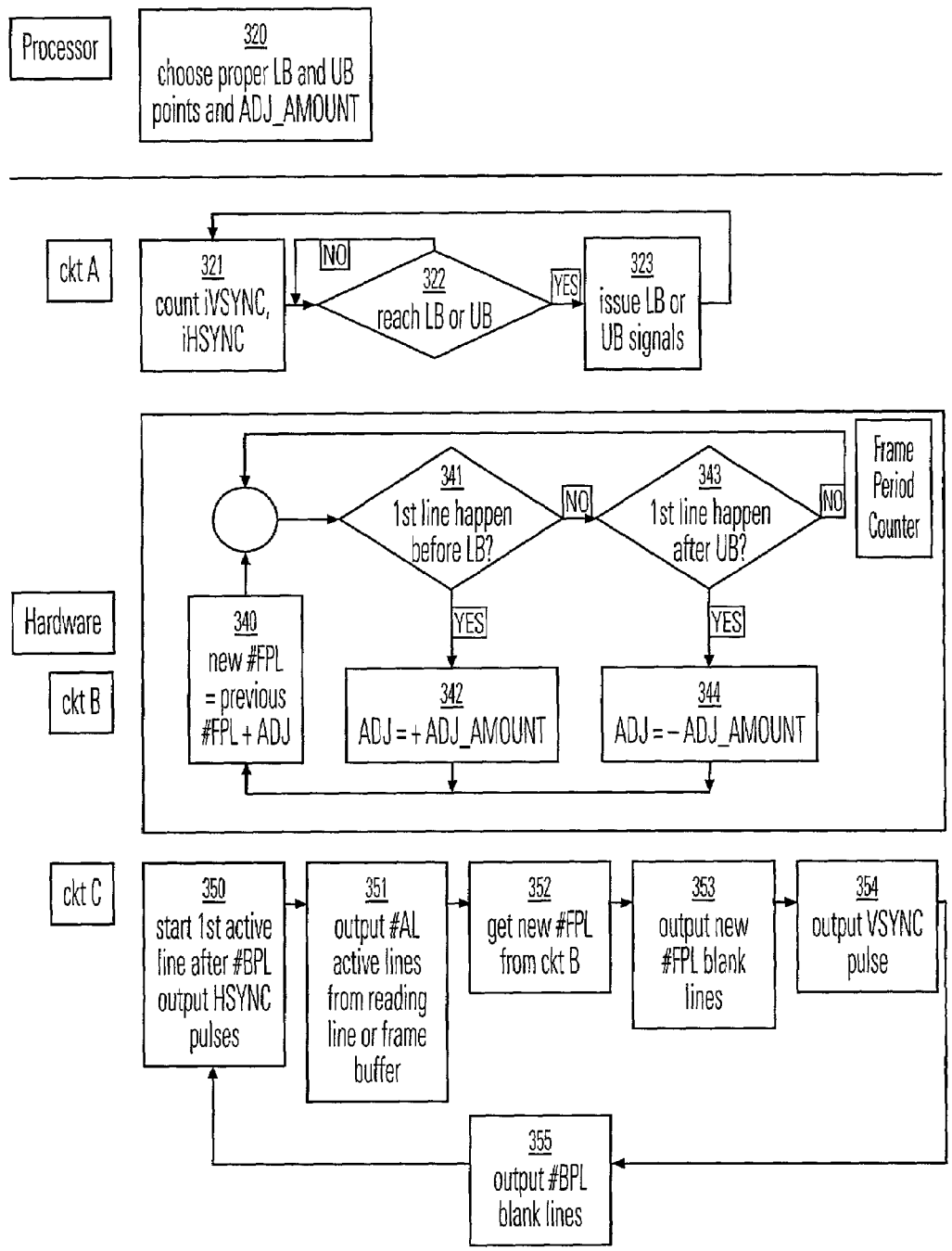
FIG. 9 is a simplified logic diagram showing one implementation of the process of FIG. 8.

FIG. 9 shows a process for implementing the technique described with reference to FIG. 8. The processor chooses a lower bound and an upper bound, and an adjustment amount (block 320). The first circuit counts the input vertical sync and input horizontal sync pulses (block 321). The process determines whether the count has reached the lower bound or upper bound values, and loops until both values are reached (block 322). The process issues a lower bound signal when the lower bound input delay is reached, and issues an upper bound signal when the upper bound input delay is reached (block 323). Another circuit computes the number of front porch lines for a frame period. This process includes logic that determines the number of front porch lines for the current frame by adding the previous number of front porch lines to an adjustment amount (block 340). The process determines whether the first output line occurs before the lower bound signal is issued (block 341). If the first line occurs before the lower bound signal is issued, then the adjustment value is equal to a positive adjustment amount (block 342), and the process loops to block 340. If the first line does not happen before the lower bound signal is issued, the process determines whether the first output line happens after the upper bound signal is issued (block 343). If the first output line does not happen before the lower bound signal or after the upper bound signal, then the process loops for detection in the next frame. If the first output line happens after the upper bound signal is issued at block 343, then the adjustment amount is set to a negative adjustment amount (block 344), and the process loops back to block 340, to compute the new number of front porch lines. The output timing generator starts the first active line after a fixed number of back porch output horizontal sync pulses (block 350). The output timing generator then generates the number of active lines by reading active pixels from the line or frame buffer and appropriately scaling the image (block 351). Then the current number of front porch lines is read from the circuit block 340 (block 352). The new number of front porch blank lines is issued after the last active line (block 353). Then the output vertical sync pulse is generated (block 354). Finally, the number of back porch lines is outputted (block 355), and the process returns to block 350 to issue the first active line.

Figure 10:
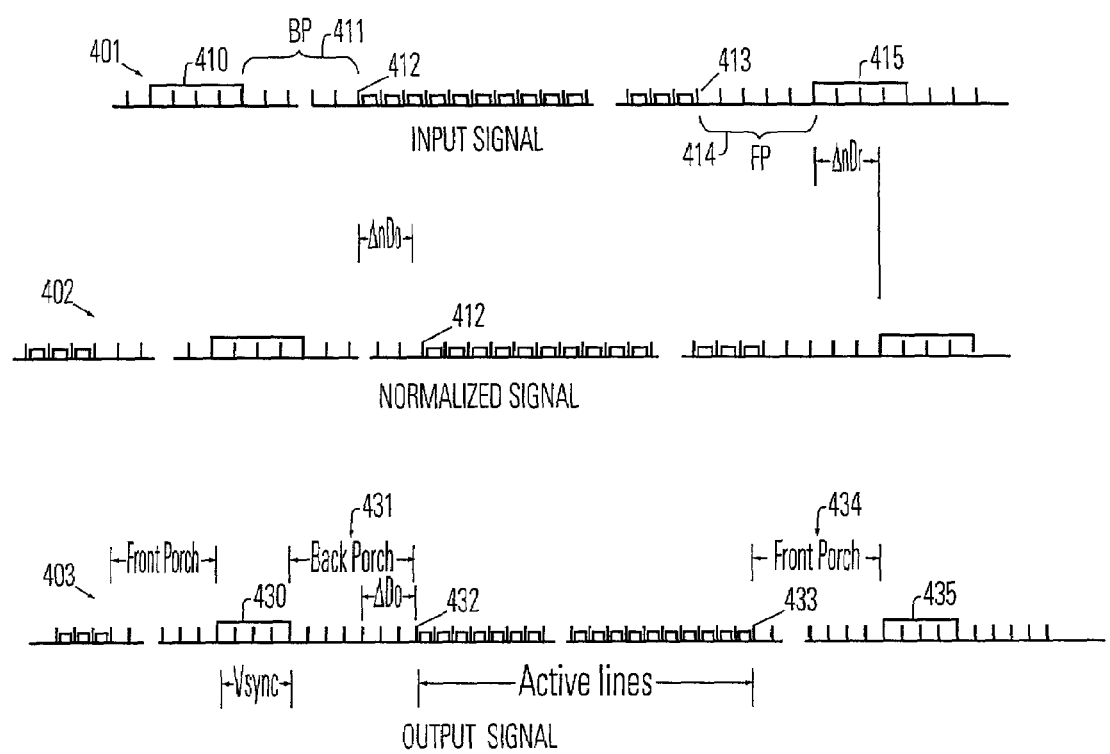
FIG. 10 is a timing diagram showing a video format bridging process based on distance locking

FIG. 10 is a timing diagram used to illustrate a distance locking technique for ensuring that the line or frame buffer does not suffer underflow or overflow conditions. In FIG. 10, the input video stream is illustrated along trace 401. Trace 402 shows a version of the input video stream in a pseudo normalized position. Trace 403 shows the output video stream. The input video stream includes an input vertical sync pulse 410, a number of back porch input horizontal sync pulses 411, a number of active lines, starting with horizontal sync pulse 412, and ending with horizontal sync pulse 413, a number of front porch horizontal sync pulses 414, and a next vertical sync pulse 415.

According to this technique, a normalized distance ΔnDo can be characterized as a number of input lines and pixels between a pixel being stored in the buffer, and a pixel being written into the output video stream, normalized to the clock rate of the input video stream. This calculation can also be normalized to the clock rate of the output video stream if desired. In this example, the trace 402 is a shifted copy of the input video stream (trace 401), in which the input horizontal sync pulse 412 is aligned with the horizontal sync pulse 432 at the beginning of the active lines in the output video stream shown in trace 403. The distance ΔDo, counting output pixel clocks, between the input horizontal sync pulse 412 in the trace 401, and the output horizontal sync pulse 432 is normalized to provide the value ΔnDo counting input pixel clocks.

The output video stream shown on trace 403 includes an output vertical sync pulse 430, a number of back porch horizontal sync pulses 431, the first horizontal sync pulse 432 in the active lines, which end with a horizontal sync pulse 433, a number of front porch horizontal sync pulses 434, and a next vertical sync pulse 435. The number of back porch output horizontal sync pulses 431, and the number of front porch horizontal sync pulses 434 can be set using algorithms discussed above with reference to FIGS. 8 and 9, or can be fixed.

The output timing generator in the video format bridge adjusts the number of pixels per line in the active lines, in order to maintain a normalized distance ΔnDo within an acceptable range. The process for adjusting the number of pixels per line, according to one embodiment is described with reference to FIG. 11.

Figure 11:
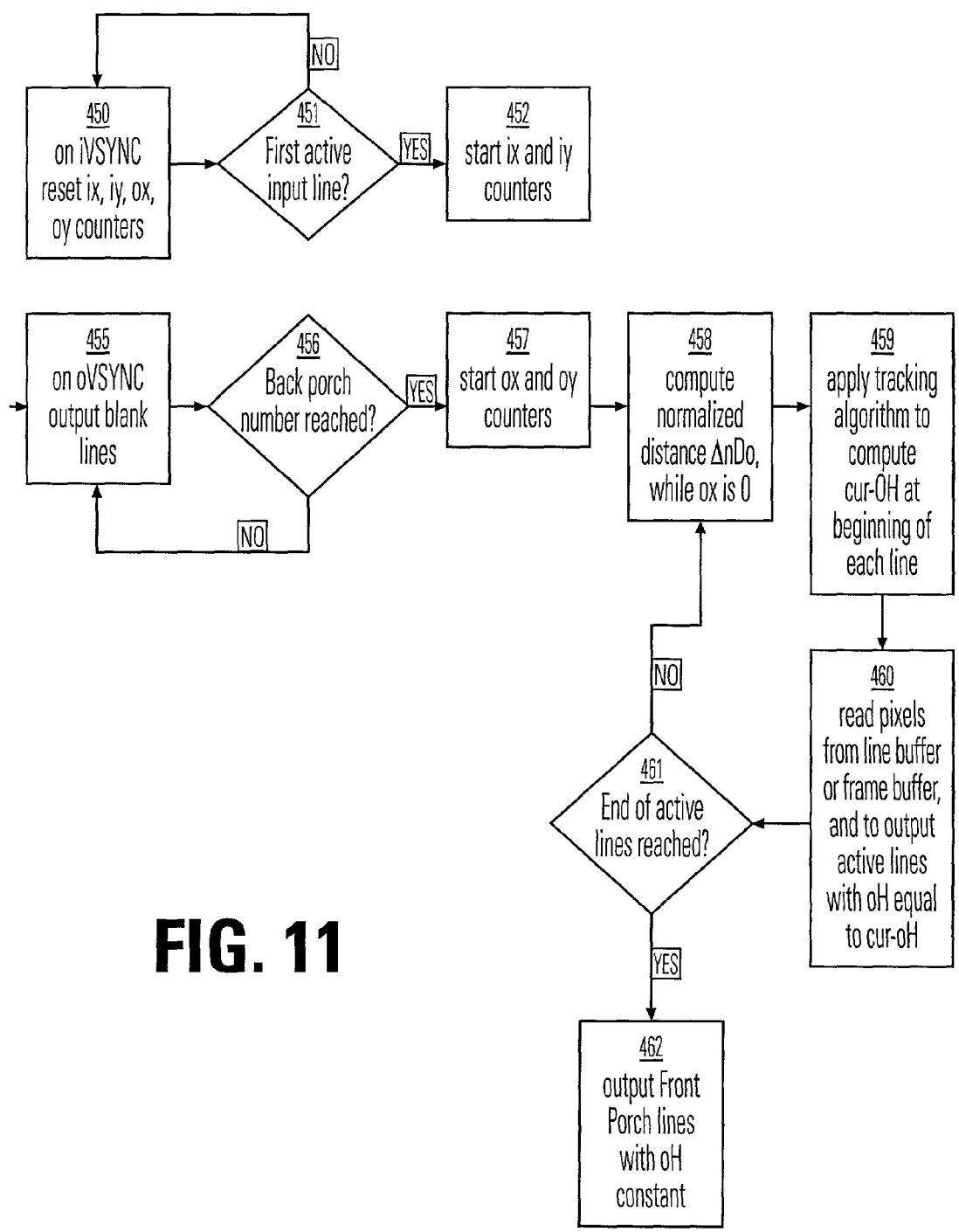
FIG. 11 is a simplified logic diagram showing one implementation of the process of FIG. 10.

FIG. 11 illustrates processes that are used to achieve distance locking according to one embodiment of the invention. A first process which is coupled to the input video stream first detects an input vertical sync pulse, and resets input x- and y- counters ix, iy, and output x- and y- counters ox, oy (block 450). Next, the process waits for a first active input line (block 451). Upon detection of the first active line, the input x- and y- counters are started (block 452). The counters continue to count until the next input vertical sync signal. A second process begins outputting blank lines upon detection of the output vertical sync signal (block 455). Blank lines are generated until the back porch number of blank lines is reached (block 456). After the back porch number of blank lines, the output x- and y- counters are started (block 457). Next, the normalized distance ΔnDo is computed while the output x- counter ox is 0 (block 458). This distance can be computed at any place in the output line. However, at the beginning of the line the calculation may be simpler. A tracking algorithm is applied to compute the number of output pixels oH for the next active line (cur-oH) at the beginning of the line (block 459). Then, pixels are read from the line or frame buffer and active line is outputted with the line width equal to cur-oH (block 450). Next the algorithm determines whether the last active line has been reached (block 461). If the last active line has not been reached, the process loops back to block 458. If the last active line has been reached, then the process outputs a number of front porch lines with a number of pixels per line oH set to a constant, such as the cur-oH for the last active line (block 462).

At block 458, the normalized distance can be calculated as using equation 8, which is based on a technique for computing the normalized distance of the beginning of an output line, where the output x- counter is 0. Thus, the normalized distance in this example is equal to the number of pixels in an input line iH multiplied by the difference between the number of the current input line iy in the input frame and the number of the current output line oy in the output frame scaled by the ratio of the number of input active lines iVDE to the number of output active lines oVDE, to which the current input pixel number ix is added.

$$\Delta nDi = iH\left(iy - oy \times \frac{iVDE}{oVDE}\right) + ix \qquad \text{eq. 8}$$

At block 459, a tracking algorithm adjusts the number of pixels per line in the output frame based upon the normalized distance. The tracking algorithm has a minimum distance locking parameter DLmin and a maximum distance locking parameter DLmax which specifies a range of distances within which the buffer is designed operate properly. The normalized distance is compared to the minimum distance locking parameter DLmin and the maximum distance locking parameter DLmax, to determine whether to apply a positive adjustment amount and a negative adjustment amount, which are equal in absolute value in one embodiment. Thus, the number of pixels for the current line cur-oH is set equal to the number of the pixels for the previous line pre-oH if the normalized distance is between the minimum and maximum distance locking parameters. The number of pixels for the current line cur-oH is set to greater of the number of pixels for the previous line pre-oH plus a positive adjustment amount+ΔH, or a maximum number of pixels per line max-oH, if the normalized distance is less than the minimum distance locking parameter DLmin. The number of pixels for the current line cur-oH is set to the lesser of the number of pixels for the previous line pre-oH less a negative adjustment amount–ΔH or the minimum number of pixels per line min-oH, if the normalized distance is greater than the maximum distance locking parameter DLmax. The positive and negative adjustment amounts can be computed for example with a first order tracking equation, where ΔH is equal to the absolute value of the normalized distance minus the average (center) of the maximum and minimum distance locking parameters, times a gain factor that is set to optimize the settling speed of the process. Other tracking equations, including higher order equations may be used.

$$cur\text{-}OH = \begin{cases} pre\text{-}OH & \text{if } DL_{\min} \leq \Delta nDi \leq DL_{\max} & \text{(Locked)} \\ pre\text{-}OH - \Delta H & \text{if } \Delta nDi > DL_{\max} & \text{(tend to overflow)} \\ \text{or min-}OH & & \\ pre\text{-}OH + \Delta H & \text{if } \Delta nDi < DL_{\min} & \text{(tend to overflow)} \\ \text{or max-}OH & & \end{cases}$$

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. An apparatus for bridging video formats from an incoming video stream, the input video stream characterized by an input frame rate, an input number of pixels per line, an input number of lines per frame, an input number of active pixels per line and an input number of active lines per frame; for display on a output display device, comprising;
   an input for an input video stream;
   an output for an output video stream for the output display;
   a buffer storing input pixels at the input clock rate, and outputting pixels for the output video stream;
   a reference clock source, and an output clock generator, responsive to the reference clock source, generating an output clock signal for the display, and using the clock signal producing a pixel clock determining pixel timing for the output video stream, a horizontal synchronization clock determining a line length in the output video stream, and a vertical synchronization clock determining a frame length in the output video stream; and
   bridge logic which produces the output video stream having an output frame rate matching the input frame rate, in which an output frame has at least one of a variable number of pixels per line within the output frame, and a variable number of lines per frame among output frames in the output video stream.

2. An apparatus for bridging video formats from an incoming video stream, the input video stream characterized by an input frame rate, an input number of pixels per line, an input number of lines per frame, an input number of active pixels per line and an input number of active lines per frame; for display on a output display device, comprising:
   an input for an input video stream;
   an outout for an output video stream for the output display;
   a buffer storing input pixels at the input clock rate, and outputting pixels for the output video stream;
   a reference clock source, and an output clock generator, responsive to the reference clock source, generating an output clock signal for the display, and using the clock signal producing a pixel clock determining pixel timing for the output video stream, a horizontal synchronization clock determining a line length in the output video stream, and a vertical synchronization clock determining a frame length in the output video stream; and
   bridge logic which produces the output video stream having an output frame rate matching the input frame rate, wherein said bridge logic produces a residue line within the output frame, the residue line having a length less than a minimum line length, and distributes said residue line using a variable number of pixels per line within the output frame.

3. An apparatus for bridging video formats from an incoming video stream, the input video stream characterized by an input frame rate, an input number of pixels per line, an input number of lines per frame, an input number of active pixels per line and an input number of active linesper frame; for display on a output display device, comprising:
   an input for an input video stream;
   an output for an output video stream for the outout display;
   a buffer storing input pixels at the input clock rate, and outputting pixels for the output video stream;
   a reference clock source, and an output clock generator, responsive to the reference clock source, generating an output clock signal for the display, and using the clock signal producing a pixel clock determining pixel timing for the output video stream, a horizontal synchronization clock determining a line length in the output video stream, and a vertical synchronization clock determining a frame length in the output video stream; and
   bridge logic which produces the output video stream having an output frame rate matching the input frame rate, wherein said bridge logic produces a residue line within the output frame, the residue line having a length less than a minimum line length, and accumulates said residue lines across multiple output frames until a number residue pixel clock cycles accumulated is greater than a minimum number of pixels per line, and then adds an extra line to an output frame in the output video stream.

4. An apparatus for bridging video formats from an incoming video stream, the input video steam characterized by an input frame rate, an input number of pixels per line, an input number of lines per frame, an input number of active pixels per line and an input number of active lines per frame; for display on a output display device, comprising:
- an input for an input video stream;
- an output for an output video stream for the output display;
- a buffer storing input pixels at the input clock rate, and outputting pixels for the output video stream;
- a reference clock source, and an output clock generator, responsive to the reference clock source, generating an output clock signal for the disnlay, and using the clock signal producing a pixel clock determining pixel timing for the output video stream, a horizontal synchronization clock determining a line length in the output video stream, and a vertical synchronization clock determining a frame length in the output video stream; and
- bridge logic which produces the output video stream having an output frame rate matching the input frame rate, in which the bridge logic matches the input frame rate to the output frame rate by determining a number of lines plus a number of pixels in the input video stream as an input delay, counting the input delay, and issuing a force signal when the input delay is reached, and starting a first active line in a frame in the output video stream synchronized with the output clock signal, in a next line after the force signal.

5. The apparatus of claim 4, wherein said predetermined input delay is computed periodically to account for variations in the input clock.

6. An apparatus for bridging video formats from an incoming video stream, the input video steam characterized by an input frame rate, an input number of pixels per line, an input number of lines per frame, an input number of active pixels per line and an input number of active lines per frame; for display on a output display device, comprising:
- an input for an input video stream;
- an output for an output video stream for the output display;
- a buffer storing input pixels at the input clock rate, and outputting pixels for the output video stream;
- a reference clock source, and an output clock generator, responsive to the reference clock source, generating an output clock signal for the disnlay, and using the clock signal producing a pixel clock determining pixel timing for the output video stream, a horizontal synchronization clock determining a line length in the output video stream, and a vertical synchronization clock determining a frame length in the output video stream; and
- bridge logic which produces the output video stream having an output frame rate matching the input frame rate, wherein said bridge logic determines a normalized distance between the input video stream and the output video stream at a position in an output line, and adjusts the number of pixels per output line in response to the normalized distance.

7. The apparatus of claim 6, wherein the logic increases the number of pixels per line if the normalized distance is less than a minimum distance, decreases the number of pixels per line if the normalized distance is greater than a maximum distance, else does not change the number of pixels per line.

8. An apparatus for bridging video formats from an incoming video stream, the input video stream characterized by an input frame rate, an input number of pixels per line, an input number of lines per frame, an input number of active pixels per line and an input number of active linesper frame; for display on a output display device, comprising:
- an input for an input video stream;
- an output for an output video stream for the outout display;
- a buffer storing input pixels at the input clock rate, and outputting pixels for the output video stream;
- a reference clock source, and an output clock generator, responsive to the reference clock source, generating an output clock signal for the display, and using the clock signal producing a pixel clock determining pixel timing for the output video stream, a horizontal synchronization clock determining a line length in the output video stream, and a vertical synchronization clock determining a frame length in the output video stream; and
- bridge logic which produces the output video stream having an output frame rate matching the input frame rate, wherein said output clock source dithers the output clock rate.

9. The apparatus of claim 1, wherein said output clock generator comprises a phase locked loop for synchronization with the input clock, and a frequency divider.

10. An apparatus for bridging video formats from an incoming video stream, the input video stream characterized by an input frame rate, an input number of pixels per line, an input number of lines per frame, an input number of active pixels per line and an input number of active linesper frame; for display on a output display device, comprising:
- an input for an input video stream;
- an output for an output video stream for the outout display;
- a buffer storing input pixels at the input clock rate, and outputting pixels for the output video stream;
- a reference clock source, and an output clock generator, responsive to the reference clock source, generating an output clock signal for the display, and using the clock signal producing a pixel clock determining pixel timing for the output video stream, a horizontal synchronization clock determining a line length in the output video stream, and a vertical synchronization clock determining a frame length in the output video stream; and
- bridge logic which produces the output video stream having an output frame rate matching the input frame rate, wherein said bridge logic includes resources to set a lower bound input delay and an upper bound input delay, wherein the lower and upper bound input delays are respective numbers of lines plus numbers of pixels in the input video stream after a fixed point; to output a first active line in a frame of the output video stream after a back porch number of lines in the output video stream after an output vertical synchronization clock cycle; to insert a front porch number of lines in the output video stream alter a last active line in said frame of the output video stream; and to adjust the number of front porch lines if the first active line in said frame in the output video stream is outputted before the lower bound input delay or after the upper bound input delay.

11. The apparatus of claim 1, wherein said bridge logic includes resources supporting a plurality of bridging processes, and resources by which a user enables and disables selected bridging processes in the plurality of bridging processes.

12. A method for bridging an input video stream to an output video stream for a display; comprising:
- generating an output clock signal for the display, and using the output clock signal producing a pixel clock determining pixel timing for the output video stream, a horizontal synchronization clock determining a line length in the output video steam, and a vertical synchronization clock determining a frame length in the output video stream;

causing an output frame supplied to the display using said output clock signal to have a period substantially the same as a frame in the input video stream;

determining a number of pixel clock cycles in a residue line within the output frame; and if the number of pixels clock cycles in the residue line is less than a minimum line length, then distributing the pixel clock cycles of the residue line to other lines in the frame, by providing a number of lines having a first number of pixel clock cycles, and a number of lines having a second number of pixel clock cycles different than the first number.

13. The method of claim 12, wherein the first number and the second number differ by one pixel clock cycle.

14. The method of claim 12, wherein the first number and the second number differ by more than one pixel clock cycle.

15. The method of claim 12, wherein said causing includes determining a number of lines plus a number of pixels in the input video stream as an input delay, counting the input delay after a fixed point, and issuing a force signal when the input delay is reached, and starting a first active line in a frame in the output video steam synchronized with the output clock signal, in a next line after the force signal.

16. The method of claim 12, wherein the output video frame has a non-integer average number of pixels per line.

17. The method of claim 15, wherein the number of pixels in the input delay is non-zero.

18. The method of claim 12, wherein the input video frame has a ratio of a number of lines per frame to a number of active lines per frame, and including adjusting said ratio by making normally inactive lines into active blank lines.

19. A method for bridging an input video stream to an output video stream for a display; comprising:

generating an output clock signal for the display, and using the output clock signal producing a pixel clock determining pixel timing for the output video stream, a horizontal synchronization clock determining a line length in the output video stream, and a vertical synchronization clock determining a frame length in the output video stream;

causing an output frame supplied to the display using said output clock signal to have a period substantially the same as a frame in the input video stream by determining a number of lines plus a number of pixels in the input video stream as an input delay, counting the input delay in the input video stream after a fixed point, and issuing a force signal when the input delay is reached, and starting a first active line in a frame in the output video stream synchronized with the output clock signal, in a next line after the force signal.

20. The method of claim 19, wherein the number of pixels in the input delay is non-zero.

21. A method for bridging an input video stream to an output video stream for a display; comprising:

generating an output clock signal for the display, and using the output clock signal producing a pixel clock determining pixel timing for the output video steam, a horizontal synchronization clock determining a line length in the output video stream, and a vertical synchronization clock determining a frame length in the output video stream;

causing an output frame supplied to the display using said output clock signal to have a period substantially the same as a frame in the input video stream; and determining a number of frames in a set of frames in the output video stream in which a number of pixel clock cycles in a residue lines of the frames in the set reaches a minimum number, and then inserting an extra line in one frame of said set of frames.

22. The method of claim 21, wherein said determining and inserting includes:

accumulating pixel clock cycles from residue lines within output frames; and when the accumulated number of pixel clock cycles is greater than a minimum number for a line in the output video frame, inserting an extra line in the output video frame and restarting said accumulating.

23. The method of claim 21, wherein the set of frames has a non-integer average number of lines per frame.

24. The method of claim 21, wherein said causing and determining includes:

setting an lower bound input delay and an upper bound input delay, wherein the lower and upper bound input delays are respective numbers of lines plus numbers of pixels in the input video stream after a fixed point;

outputting a first active line in a frame of the output video stream after a back porch number of lines in the output video stream after an output vertical synchronization clock cycle;

inserting a front porch number of lines in the output video stream after a last active line in said frame of the output video stream; and adjusting the number of front porch lines if the first active line in said frame in the output video stream is outputted before the lower bound input delay or after the upper bound input delay.

25. The method of claim 24, wherein the number of pixels in one of the lower bound input delay and upper bound input delay is non-zero.

26. A method for bridging an input video stream to an output video stream for a display; comprising:

generating an output clock signal for the display, and using the output clock signal producing a pixel clock determining pixel timing for the output video stream, a horizontal synchronization clock determining a line length in the output video stream, and a vertical synchronization clock determining a frame length in the output video stream;

setting an lower bound input delay and an upper bound input delay, wherein the lower and upper bound input delays are respective numbers of lines plus numbers of pixels in the input video stream;

outputting a first active line in a frame of the output video stream after a back porch number of lines in the output video stream after an output vertical synchronization clock cycle;

inserting a front porch number of lines in the output video stream after a last active line in said frame of the output video stream; and adjusting the number of front porch lines if the first active line in said frame in the output video stream is outputted before the lower bound input delay or after the upper bound input delay.

27. The method of claim 26, wherein the number of pixels in one of the lower bound input delay and upper bound input delay is non-zero.

28. A method for bridging an input video stream to an output video stream for a display; comprising:

generating an output clock signal for the display, and using the output clock signal producing a pixel clock determining pixel timing for the output video stream, a horizontal synchronization clock determining a line length in the output video stream, and a vertical synchronization clock determining a frame length in the output video stream;

counting input active lines and pixels to determine a position in the input frame and output active lines and pixels to determine a position in the output frame;

during outputting of active output lines, determining a normalized distance between the position in the input frame and the position in the output frame; and adjusting the number of pixels per line according to the normalized distance.

29. The method of claim 28, including determining the normalized distance at the beginning of output active lines.

30. The method of claim 28, including adjusting the number of pixels per line at the end of output active lines.

31. The method of claim 28, including:

setting an lower bound input delay and an upper bound input delay, wherein the lower and upper bound input delays are respective numbers of lines plus numbers of pixels in the input video stream;

outputting a first active line in a frame of the output video stream alter a back porch number of lines in the output video stream after an output vertical synchronization clock cycle;

inserting a front porch number of lines in the output video stream after a last active line in said frame of the output video stream; and adjusting the number of front porch lines if the first active line in said frame in the output video stream is outputted before the lower bound input delay or after the upper bound input delay.

32. The method of clam 28, including:

causing an output frame supplied to the display using said output clock signal to have a period substantially the same as a frame in the input video stream; and determining a number of frames in a set of frames in the output video stream in which a number of pixel clock cycles in a residue lines of the frames in the set reaches a minimum number, and then inserting an extra line in one frame of said set of frames.

33. The method of claim 32, wherein said determining and inserting includes:

accumulating pixel clock cycles from residue lines within output frames; and when the accumulated number of pixel clock cycles is greater than a minimum number for a line in the output video frame, inserting an extra line in the output video frame and restarting said accumulating.

34. The method of claim 32, wherein the set of frames has a non-integer average number of lines per frame.

35. The method of claim 28, wherein said generating includes dithering the frequency of the output clock signal to provide a spread spectrum effect.

* * * * *